United States Patent
Höft (10) Patent No.: US 11,027,328 B2
(45) Date of Patent: Jun. 8, 2021

(54) REFRACTORY COATING COMPOSITION FOR MAKING FACINGS ON TEMPORARY MOLDS OR ON CORES FOR IRON AND STEEL CASTING OPERATIONS

(71) Applicant: HÜTTENES-ALBERTUS CHEMISCHE WERKE GESELLSCHAFT MIT BESCHRÄNKTER HAFTUNG, Düsseldorf (DE)

(72) Inventor: René Höft, Rechtsupweg (DE)

(73) Assignee: HÜTTENES-ALBERTUS CHEMISCHE WERKE GESELLSCHAFT MIT BESCHRÄNKTER HAFTUNG, Düsseldorf (DE)

( * ) Notice: Subject to any disclaimer, the term of this patent is extended or adjusted under 35 U.S.C. 154(b) by 0 days.

(21) Appl. No.: 16/313,960

(22) PCT Filed: Jun. 29, 2017

(86) PCT No.: PCT/EP2017/066105
§ 371 (c)(1),
(2) Date: Dec. 28, 2018

(87) PCT Pub. No.: WO2018/002206
PCT Pub. Date: Jan. 4, 2018

(65) Prior Publication Data
US 2019/0224745 A1 Jul. 25, 2019

(30) Foreign Application Priority Data
Jun. 30, 2016 (DE) .................. 10 2016 211 930.3

(51) Int. Cl.
B22C 3/00 (2006.01)
B22C 9/02 (2006.01)
C09D 1/00 (2006.01)

(52) U.S. Cl.
CPC .................. *B22C 3/00* (2013.01); *B22C 9/02* (2013.01); *C09D 1/00* (2013.01)

(58) Field of Classification Search
None
See application file for complete search history.

(56) References Cited

U.S. PATENT DOCUMENTS
2,618,530 A 11/1952 Gardner

FOREIGN PATENT DOCUMENTS
CN 1116138 2/1996
CN 1524644 9/2004
(Continued)

OTHER PUBLICATIONS

Feng et al, CN 1116138, English Translation by Google, pp. 1-3 (Year: 1996).*

(Continued)

*Primary Examiner* — Colin W. Slifka
(74) *Attorney, Agent, or Firm* — Duane Morris LLP; Gregory M. Lefkowitz; Brandon A. Chan (57) ABSTRACT

The invention relates to a refractory coating composition for producing mold coatings on non-permanent molds or on cores for the casting of iron and steel, comprising
a) an alkali metal salt or alkaline earth metal salt of carbonic acid and/or an alkali metal salt or alkaline earth metal salt of diphosphoric acid,
b) a carrier liquid and
c) refractory materials.

18 Claims, 1 Drawing Sheet

(56) References Cited

FOREIGN PATENT DOCUMENTS

| | | |
|---|---|---|
| CN | 101642795 | 2/2010 |
| CN | 101817058 | 9/2010 |
| CN | 102549130 | 7/2012 |
| CN | 102762512 | 10/2012 |
| CN | 103008531 | 4/2013 |
| CN | 103857480 | 6/2014 |
| CN | 104550677 | 4/2015 |
| CN | 105170888 | 12/2015 |
| CN | 105710277 | 6/2016 |
| DE | 63853 | 9/1968 |
| DE | 202015105368 | 11/2015 |
| EP | 2853320 | 4/2015 |
| EP | 3006136 | 4/2016 |
| WO | 93/17815 | 9/1993 |
| WO | 2004/071738 | 8/2004 |
| WO | 2009/007093 | 1/2009 |
| WO | 2009004090 | 1/2009 |

OTHER PUBLICATIONS

European Standard, "Founding—Spheroidal graphite cast irons", DIN EN 1563, May 2015, 96 pages.
Schrey et al., "The barrier effect of coatings against the penetration of sulphur from cold resin moulding sands when casting ferrous materials", Giesserie, Sep. 15, 1999, vol. 96, No. 9, 14 pages English Translation.
Manual of Casting Engineer, The Manual of Casting Engineer Writing Group, China Machine Press, p. 756, Feb. 1997.

\* cited by examiner

REFRACTORY COATING COMPOSITION FOR MAKING FACINGS ON TEMPORARY MOLDS OR ON CORES FOR IRON AND STEEL CASTING OPERATIONS

CROSS-REFERENCE TO RELATED APPLICATIONS

This application is a § 371 national stage entry of International Application No. PCT/EP2017/066105, filed on Jun. 29, 2017, which claims priority to German Patent Application No. 10 2016 211 930.3, filed on Jun. 30, 2016, the entire contents of which are incorporated herein by reference.

The present invention relates to a refractory coating composition for producing mold coatings on non-permanent molds or on cores for the casting of iron and steel, use of an alkali metal salt or alkaline earth metal salt of carbonic acid and/or diphosphoric acid for producing mold coatings on non-permanent molds or on cores for the casting of iron and steel, a process for producing a casting and also a casting mold composed of a chemically bound base mold material for producing a casting.

Most products of the iron and steel industry and also of the nonferrous metals industry go through casting processes for first shaping. Here, the molten materials, ferrous metals or nonferrous metals, are converted into shaped objects having particular workpiece properties. For shaping the castings, it is necessary firstly to produce sometimes very complicated casting molds for accommodating the metal melt. The casting molds are divided into non-permanent molds which are destroyed after each casting operation and permanent molds by means of which a large number of castings can in each case be produced. The non-permanent molds usually consist of a refractory, particulate mold material which is strengthened by means of a curable binder.

Molds are negatives and contain the hollow space to be filled by casting so as to give the casting to be manufactured. The internal contours of the future casting are formed by cores. In production of the mold, the hollow space in the mold material is formed by means of a pattern of the casting to be manufactured. Internal contours are represented by cores which are formed in a separate core box.

To produce the casting molds, it is possible to use either organic or inorganic binders, the curing of which can be effected by cold or hot processes. The term cold processes refers to processes in which the curing occurs essentially at room temperature without heating of the mold material mixture. Curing here usually occurs by means of a chemical reaction which can, for example, be triggered by a gaseous catalyst being passed through the mold material mixture to be cured or by a liquid catalyst being added to the mold material mixture. In the case of hot processes, the mold material mixture is, after shaping, heated to a temperature which is sufficiently high to drive off, for example, the solvent present in the binder or to initiate a chemical reaction by means of which the binder is cured by crosslinking.

In the production of casting molds for large castings, for example engine blocks of marine diesels or large machine parts such as hubs of rotors for wind turbines, use is mostly made of "no-bake binders". In the "no-bake process", the refractory base mold material (e.g. sand) is frequently firstly coated with a catalyst (hardener), the binder is subsequently added and distributed uniformly over the catalyst-coated grains of the refractory base mold material by mixing. In this process, continuous flow-through mixers are frequently employed. The resulting mold material mixture can then be shaped to give a shaped body. Since binder and catalyst are uniformly distributed in the mold material mixture, curing occurs largely uniformly even in the case of large shaped bodies.

Cast iron containing spheroidal graphite (GJS) is an iron-carbon material whose carbon is present predominantly in spheroidal (nodular) form. Cast iron containing spheroidal graphite has steel-like materials properties. The nodular shape of the graphite results in high strengths combined with a very good, permanent deformation (elongation). Both the workability and the associated tool operating lives are increased by small proportions of perlite. Cast iron containing spheroidal graphite is used, for example, in the vehicle industry, machine construction and shipbuilding, in pressure vessels or in the wind power industry. GJS cast iron grades are described in DIN EN 1563, foundry operation—cast iron containing spheroidal graphite.

Cast iron containing lamellar graphite (GJL) likewise has excellent practical properties and in many cases presents a person skilled in the art with similar requirements to GJS. The significant differences between GJL and GJS which are relevant to industrial practice are known to a person skilled in the art.

In GJS and GJL casting, casting defects referred to as "pitted surfaces" occur.

These defects are pockmark-like roughenings and depressions occurring over the cast surface or in the casting skin. They are covered with a coating having a white to slightly bluish appearance. The defect is therefore also referred to as "white film". The coating consists essentially of (fibrous) silicon oxides. On particle blasting of the castings, the coating is removed and only the pitted surface remains.

The defect occurs in the case of GJS and GJL castings which have been produced by means of casting molds and cores which consist of a chemically bound mold material which in turn consists of silica sand and an acid-cured binder. The defect occurs especially in the case of acid-cured furan resin mold materials and other acid-cured, cold-curing processes, e.g. the phenolic resin process. The greatest susceptibility to the defect has been found in the case of regenerated furan resin sands having a loss on ignition in the range from 3 to 4.5%.

The defect also occurs when using cores and molds which have been produced by the Croning process and also in the clay-bonded mold material ("green sand") process.

A detailed description of the occurrence of the defect can be found in the following literature references:
1) M. Schrod, H. J. Wojtas, Oberflächenfehler insbesondere bei GJS, 7$^{th}$ Mold Material Conference, Duisburg February 2008
2) H. G. Levelink, F. P. M. A Julien, Eigenschaften von regeneriertem Furanharzsand, Giesserei 68 (1981) 340
3) S. Hasse, Guß-und Gefügefehler, Schiele & Schön, Berlin, 2$^{nd}$ edition, 2003, 343.

The document DE 20 2015 105 368 U1 discloses the use of a basic composition comprising a basic component consisting of one or more bases and a carrier liquid for the basic component as infiltration agent for the mold material of a casting mold comprising silica sand and a binder cured by means of acid and for suppressing the formation of pitted surfaces during the casting process.

WO 2004/071738 A1 discloses a coating composition comprising a water-soluble salt as filler. The use of this coating composition as refractory coating for salt cores for use in foundry technology is also described.

The document WO 2009/007093 A2 discloses a refractory coating composition comprising ceramic materials and at least one binder selected from the group consisting of binders based on water glass and refractory binders in combination with fluoride-containing constituents. The water glass used is produced by reaction of carbonates with silica sand, with carbon dioxide being given off and the carbonates being decomposed in the reaction.

DD 63 853 A1 discloses a refractory coating for permanent molds for the casting of light metals and nonferrous metals. The refractory coating described contains an alkali metal salt and/or alkaline earth metal salt that does not melt and is not decomposed at the casting temperature, preferably sodium carbonate or sodium sulfate or magnesium sulfate.

EP 2 853 320 A1 describes a casting mold and a casting core composed of coated mold sand for metal casting. A first layer which is cured and consists of water glass and/or phosphate glass is arranged on the surface of mold sand grains of the mold sand. Phosphate glasses are glasses which contain predominantly phosphorus pentoxide as glass former.

The white deposits occur predominantly in the case of thick-walled parts, i.e. on medium to heavy castings. Relatively small compact castings having a high modulus are also affected. The defect occurs mostly in zones of the casting which have been subjected to high thermal stress, for example the radii, but can from there also spread over larger areas. Beneath the surface of the affected zones, the graphite is partly present in degraded form.

The casting defect leads to increased fettling in the foundry and has hitherto been able to be countered only by increased areas dimensioning of the affected. In the extreme case, pitted surfaces lead to rejection of the casting.

Owing to the roughness and depressions on the casting surface, the affected areas firstly have to be ground in a costly manner before they are subjected to an ultrasound test or crack test for the purpose of quality monitoring of the casting.

In the process for producing GJS and GJL castings using cold-curing mold materials with non-permanent molds, there is a need for a constant process by means of which it is possible to produce castings which have good cast surfaces reproducibly and inexpensively.

For this reason, it is necessary to find solutions in the case of which pitted surfaces are avoided even in subregions of the surface of the casting.

S. Hasse, Guß-und Gefügefehler, Schiele & Schön, Berlin, $2^{nd}$ edition, 2003, 343, has described some measures by means of which the casting defects can be at least reduced. However, the measures described are all not yet satisfactory since they make the casting process more expensive, for example by increasing the sand waste, and are therefore not economically feasible or difficult to implement industrially.

Penetrating refractory coatinges are described in "Beitrag zum Entstehungsmechanismus des Gussoberflächenfehlers weißer Belag und Erarbeiten von Lösungsvorschlägen zur Vermeidung, thesis by E. Potaturina, T U Bergakademie Freiberg, March 2014". These penetrating refractory coatinges contain manganese(IV) oxide (pyrolusite). Manganese(IV) oxide (pyrolusite) is insoluble in water and alcohols and reacts amphoterically. The use of impregnating refractory coatinges comprising manganese dioxide has the disadvantage that the manganese dioxide reduces the heat resistance of the mold material. There is a risk of formation of casting defects. Furthermore, these penetrating refractory coatinges as described by E. Potaturina can at best reduce the casting defect "pitted surfaces".

Penetrating refractory coatinges, i.e. refractory coatinges which penetrate into the mold material and fill the pores in the mold material with their refractory materials, are customarily used in casting processes. They are particularly suitable for avoiding casting defects such as penetrations and erosions. These refractory coatinges normally contain relatively large amounts of refractory materials and can also contain inorganic or organic binders. Commercial refractory coatinges normally penetrate into the mold material on application.

It was a primary object of the present invention to find a way of suppressing or greatly reducing the formation of pitted surfaces (white films) during the casting process. In this way, it should, for example, be possible to manufacture the GJS and GJL castings with conventional dimensions.

An important aspect of the present invention was that no toxic chemicals be used for achieving the primary object and that emission of toxic compounds during casting be minimized or avoided completely.

Ideally, it should also remain possible to employ the processes customary in a foundry using the materials for core and mold production which are usually present in a foundry. It should preferably also be possible to treat only the critical regions of the molds and cores for producing the GJS and GJL castings; this would allow production costs to be saved. In addition, the mold material circuit should be encumbered very little by the process in order to avoid complicated compensation measures or additions of fresh sand. It should likewise be possible to avoid or to achieve at least one of the following points, preferably a number or all of the following points:

avoidance of rejects
avoidance of fettling
avoidance of increased treatment additions
achievement of required surface qualities
avoidance of sintering of the cast surfaces
lowering of the testing efforts, e.g. in an ultrasound test/crack test
improvement of the mechanical properties of the finished casting.

This object is surprisingly achieved by a refractory coating composition for producing mold coatings on non-permanent molds or on cores for the casting of iron and steel, comprising
  a) an alkali metal salt or alkaline earth metal salt of carbonic acid and/or an alkali metal salt or alkaline earth metal salt of diphosphoric acid,
  b) a carrier liquid and
  c) refractory materials.

Our own studies have surprisingly shown that alkali metal salts or alkaline earth metal salts of carbonic acid and alkali metal salts or alkaline earth metal salts of diphosphoric acid, in each case either individually or in combination with one another, can greatly reduce or completely avoid the casting defect "white film". At the same time, the alkali metal salts or alkaline earth metal salts of carbonic acid and the alkali metal salts or alkaline earth metal salts of diphosphoric acid are toxicologically unproblematical.

For the purposes of the present invention, a refractory material is a material which is stable at the temperatures in the range from 1300 to 1600° C. normally used in iron casting and steel casting, i.e. retains its chemical composition even under the oxidizing conditions prevailing in the casting industry and preferably also retains its physical properties.

In an embodiment of the refractory coating composition of the invention which is particularly preferred according to the invention, the refractory coating composition is a covering refractory coating and not an infiltrating refractory coating.

A covering refractory coating is, for the purposes of the invention, a refractory coating which penetrates less than 2 mm into the mold material or preferably does not penetrate into the mold material and usually comes into direct contact with the melt. Covering refractory coatinges form a covering layer on the mold material after application to the mold material.

An infiltrating refractory coating is, for the purposes of the invention, a refractory coating which penetrates at least 2-4 mm into the mold material.

Preference is given according to the invention to refractory coating compositions in which the alkali metal salt or alkaline earth metal salt of carbonic acid is a primary or secondary carbonate and/or the alkali metal salt or alkaline earth metal salt of diphosphoric acid is a dihydrogendiphosphate.

A secondary carbonate has the general formula $MHCO_3$ and is a hydrogencarbonate and a secondary carbonate has the general formula $M_2CO_3$ or $MCO_3$, where M is an alkali metal or alkaline earth metal.

Our own studies have shown that the hydrogencarbonates and the dihydrogendiphosphates are particularly preferred according to the invention since in the refractory coating compositions of the invention they lead to particularly good casting results when the refractory coating composition is used for producing mold coatings on non-permanent molds or on cores for the casting of iron and steel.

Preference is given according to the invention to refractory coating compositions according to the invention in which the alkali metal salt or alkaline earth metal salt of carbonic acid is a lithium, sodium, potassium, calcium, magnesium, barium or strontium salt, with particular preference being given to the sodium salt.

Preference is given according to the invention to refractory coating compositions in which the alkali metal salt or alkaline earth metal salt of carbonic acid is sodium carbonate or sodium hydrogencarbonate.

It has surprisingly been found that sodium hydrogencarbonate and sodium carbonate have particularly good properties. Sodium hydrogencarbonate is used as food additive, e.g. in baking powder, and is therefore toxicologically unproblematical. Sodium carbonate is likewise used as food additive and is well known under the name soda. In addition, both compounds are available in large quantities and are inexpensive. Furthermore, refractory coating compositions according to the invention containing sodium hydrogencarbonate or sodium carbonate display a very great reduction or avoidance of the casting defect "white film".

Preference is given according to the invention to refractory coating compositions comprising from 0.1 to 50% by weight, preferably from 0.5 to 30% by weight, particularly preferably from 3 to 15% by weight, of the alkali metal salt or alkaline earth metal salt of carbonic acid, based on the total weight of the refractory coating composition.

Preference is given according to the invention to refractory coating compositions comprising from 0.1 to 50% by weight, preferably from 0.5 to 30% by weight, particularly preferably from 3 to 15% by weight, of the alkali metal salt or alkaline earth metal salt of diphosphoric acid, based on the total weight of the refractory coating composition.

Refractory coating compositions which have a molar ratio between the alkali metal salt or alkaline earth metal salt of carbonic acid and the alkali metal salt or alkaline earth metal salt of diphosphoric acid in the range from 1:26 to 10:2.6, preferably in the range from 1:13 to 5:2.6, particularly preferably in the range from 1:5.2 to 1:1.3, are preferred for the purposes of the invention.

Our own studies have shown that the content of alkali metal salt or alkaline earth metal salt of carbonic acid or diphosphoric acid has an influence on the quality of the casting. At proportions which are too low, the alkali metal salt or alkaline earth metal salt of carbonic acid or diphosphoric acid displays no or only very little effect, while the effect is no longer improved at proportions which are too high.

Preference is given according to the invention to refractory coating compositions according to the invention in which the alkali metal salt or alkaline earth metal salt of diphosphoric acid is disodium dihydrogendiphosphate.

It has surprisingly been found that disodium dihydrogendiphosphate has particularly good properties. Disodium dihydrogendiphosphate is used as food additive, e.g. in baking powder, and is therefore toxicologically unproblematical. In addition, it is available in large quantities and is inexpensive. Furthermore, refractory coating compositions according to the invention which contain disodium dihydrogendiphosphate display a very great reduction or avoidance of the casting defect "white film".

Particular preference is given to refractory coating compositions according to the invention containing an alkali metal salt or alkaline earth metal salt of carbonic acid and an alkali metal salt or alkaline earth metal salt of diphosphoric acid.

Our own studies have surprisingly shown that a mixture of an alkali metal salt or alkaline earth metal salt of carbonic acid and an alkali metal salt or alkaline earth metal salt of diphosphoric acid leads to virtually complete avoidance of the casting defect "white film". These mixtures have a synergistic effect which cannot be achieved by means of the individual compounds in this form. In addition, it was found in our own studies that sintering of the cast surfaces can also be very largely avoided or prevented completely by use of a mixture of an alkali metal salt or alkaline earth metal salt of carbonic acid and an alkali metal salt or alkaline earth metal salt of diphosphoric acid.

Particular preference is given according to the invention to refractory coating compositions containing sodium carbonate and/or sodium hydrogencarbonate as alkali metal salt or alkaline earth metal salt of carbonic acid and disodium dihydrogendiphosphate as alkali metal salt or alkaline earth metal salt of diphosphoric acid.

The mixture of a) sodium hydrogencarbonate and/or sodium carbonate and b) disodium dihydrogendiphosphate in particular displays, in our own studies, complete or virtually complete avoidance of the casting defect "white film" and prevention of sintering of the cast surface.

Refractory coating compositions which have a weight ratio between a) sodium hydrogencarbonate and/or sodium carbonate and b) disodium dihydrogendiphosphate in the range from 1:10 to 10:1, preferably in the range from 1:5 to 5:1, particularly preferably in the range from 1:2 to 2:1, are preferred for the purposes of the invention.

Preference is given according to the invention to refractory coating compositions which comprise a mixture of an alkali metal salt or alkaline earth metal salt of carbonic acid and an alkali metal salt or alkaline earth metal salt of diphosphoric acid and in the case of which the refractory coating composition has a pH of from 7 to 9.9, preferably a pH of from 7.5 to 9.5.

In an alternative embodiment of the refractory coating composition of the invention, the refractory coating comprises an alkali metal salt or alkaline earth metal salt of carbonic acid but no alkali metal salt or alkaline earth metal salt of diphosphoric acid and has a pH of from 9 to 10, preferably a pH of from 9.5 to 11.5.

In an alternative embodiment of the refractory coating composition of the invention, the refractory coating comprises an alkali metal salt or alkaline earth metal salt of carbonic acid but no alkali metal salt or alkaline earth metal salt of diphosphoric acid and has a pH of from 9 to 12, preferably a pH of from 9.5 to 11.5.

In an alternative embodiment of the refractory coating composition of the invention, the refractory coating comprises an alkali metal salt or alkaline earth metal salt of diphosphoric acid but no alkali metal salt or alkaline earth metal salt of carbonic acid and has a pH of from 5 to 8, preferably a pH of from 5.5 to 7.5.

Preference is given according to the invention to refractory coating compositions in which the carrier liquid is water or contains water.

Water as carrier liquid has, in particular, the advantage that it is readily available, inexpensive and toxicologically unproblematical. In addition, the alkali metal salts or alkaline earth metal salts of carbonic acid (and in particular sodium hydrogencarbonate or sodium carbonate) and the alkali metal salts or alkaline earth metal salts of diphosphoric acid (and in particular disodium dihydrogendiphosphate) are very readily soluble in water.

Preference is given according to the invention to refractory coating compositions according to the invention in which the carrier liquid is an alcohol or contains alcohol, preferably an alcohol selected from the group consisting of methanol, ethanol, 1-propanol, 2-propanol, n-butanol, isobutanol, sec-butanol, tert-butanol, pentan-1-ol, pentan-2-ol, pentan-3-ol, 2-methylbutan-1-ol, 2-methylbutan-2-ol, 3-methylbutan-1-ol, 3-methylbutan-2-ol, 2,2-dimethylpropan-1-ol, hexan-1-ol, hexan-2-ol, hexan-3-ol, 2-methylpentan-1-ol, 3-methylpentan-1-ol, 4-methylpentan-1-ol, 2-methylpentan-2-ol, 3-methylpentan-2-ol, 4-methylpentan-2-ol, 2-methylpentan-3-ol, 3-methylpentan-3-ol, 2,2-dimethylbutan-1-ol, 2,3-dimethylbutan-1-ol, 3,3-dimethylbutan-1-ol, 2,3-dimethylbutan-2-ol, 3,3-dimethylbutan-2-ol, 2-ethylbutan-1-ol and mixtures thereof, with particular preference being given to ethanol, 1-propanol, 2-propanol and mixtures thereof.

Preference is given according to the invention to refractory coating compositions in which the carrier liquid is a mixture of one or more organic solvents and water, where the organic solvent is preferably an alcohol. Our own experiments have shown that water and in particular the preferred alcohols have particularly good practical properties. They vaporize sufficiently quickly and are physiologically unproblematical or present few problems physiologically and can be employed in a foundry without extensive safety precautions.

Preference is given according to the invention to refractory coating compositions in which the solids content of the refractory coating composition is from 5 to 85% by weight, preferably from 10 to 80% by weight, particularly preferably from 30 to 70% by weight.

Preference is given according to the invention to refractory coating compositions in which the refractory coating composition contains from 10 to 85% by weight of refractory materials, based on the solids content of the refractory coating composition.

Preference is given according to the invention to refractory coating compositions in which the refractory materials are selected from the group consisting of silica, aluminum oxide (preferably α-alumina), zirconium dioxide, aluminum silicates, mullite, zircon sands, zirconium silicates, olivine, talc, mica, coke, feldspar, diatomite, calcined kaolins, kaolinite, metakaolinite, magnesium silicates, iron oxide, bauxite, graphite and mixtures thereof, preferably magnesium silicates (in particular talc), zirconium silicates and mixtures thereof.

Preference is given according to the invention to refractory coating compositions according to the invention which additionally comprise colored pigments, rheological additives, floating agents and/or thickeners.

Particular preference is given according to the invention to refractory coating compositions for producing mold coatings on non-permanent molds or on cores for the casting of iron and steel which consist of or comprise
  a) from 3 to 15% by weight of sodium hydrogencarbonate and/or sodium carbonate and from 3 to 15% by weight of disodium dihydrogendiphosphate, in each case based on the total weight of the refractory coating composition,
  b) a carrier liquid preferably selected from the group consisting of water, ethanol, 1-propanol, 2-propanol and mixtures thereof,
  c) refractory materials selected from the group consisting of silica, aluminum oxide (preferably α-alumina), zirconium dioxide, aluminum silicates, mullite, zircon sands, zirconium silicates, olivine, talc, mica, coke, feldspar, diatomite, calcined kaolins, kaolinite, metakaolinite, magnesium silicates, iron oxide, bauxite, graphite and mixtures thereof, preferably consisting of magnesium silicates (in particular talc), zirconium silicates and mixtures thereof,
where the refractory coating composition has a pH of from 7 to 9.9, preferably a pH of from 7.5 to 9.5, and the weight ratio between a) sodium hydrogencarbonate or sodium carbonate and b) disodium dihydrogendiphosphate is preferably in the range from 1:10 to 10:1, more preferably in the range from 1:5 to 5:1, particularly preferably in the range from 1:2 to 2:1.

A further aspect of the present invention provides for the use of an alkali metal salt or alkaline earth metal salt of carbonic acid and/or an alkali metal salt or alkaline earth metal salt of diphosphoric acid for producing mold coatings on non-permanent molds or on cores for the casting of iron and steel.

Preference is given according to the invention to using the refractory coating composition of the invention for coating non-permanent molds or on cores which preferably comprise silica sand and a binder which has been cured by means of acid for the casting of iron and steel.

According to the invention, preference is likewise given to the use for avoiding or reducing the formation of white film on the surface of castings during the casting operation.

A further aspect of the present invention provides for the use of an alkali metal salt or alkaline earth metal salt of carbonic acid and/or an alkali metal salt or alkaline earth metal salt of diphosphoric acid as additive in refractory coatinges for the foundry industry.

Preference is given according to the invention to the use of a) an alkali metal salt or alkaline earth metal salt of diphosphoric acid or b) a mixture of (at least) one alkali metal salt or alkaline earth metal salt of carbonic acid and (at least) one alkali metal salt or alkaline earth metal salt of diphosphoric acid as additive in refractory coatinges for the foundry industry.

Particular preference is given according to the invention to the use of a) sodium carbonate and/or b) sodium hydrogencarbonate and/or c) disodium dihydrogendiphosphate as additive in refractory coatinges for the foundry industry.

Very particular preference is given according to the invention to the use of a) disodium dihydrogendiphosphate and/or b) a mixture of
- b. i) disodium dihydrogendiphosphate and
- b. ii) sodium hydrogencarbonate and/or sodium carbonate as additive in refractory coatinges for the foundry industry.

According to the invention, preference is likewise given to the use of a) sodium carbonate and/or b) sodium hydrogencarbonate and/or c) disodium dihydrogendiphosphate as additive in refractory coatinges for the foundry industry, so that a refractory coating composition according to the invention results.

A further aspect of the present invention provides a process for producing a casting, comprising the following steps:
- (i) providing or producing a casting mold composed of chemically bound base mold material which preferably comprises one or more binders cured by means of acid and silica sand,
- (ii) coating at least one region of the casting mold with a refractory coating composition according to the invention and drying of the coated refractory coating composition,
- (iii) filling the casting mold with a molten iron-carbon alloy,
- (iv) allowing the iron-carbon alloy to solidify in the casting mold so as to result in a casting.

Preference is given according to the invention to a process for producing a casting, wherein a penetrating refractory coating is applied to at least one region of the casting mold before coating of the at least one region of the casting mold with a refractory coating composition according to the invention (step (ii) of the process of the invention). The penetrating refractory coating preferably contains aluminum oxide and/or kaolin, particularly preferably from 50 to 75% by weight of aluminum oxide and/or from 5 to 10% by weight of kaolin, in each case based on the total weight of the penetrating refractory coating.

According to the invention, preference is likewise given to a process for producing a casting, wherein a first covering refractory coating is applied to at least one region of the casting mold before coating of the at least one region of the casting mold with a refractory coating composition according to the invention (step (ii) of the process of the invention), where this first covering refractory coating comprises no alkali metal salt or alkaline earth metal salt of carbonic acid and/or no alkali metal salt or alkaline earth metal salt of diphosphoric acid. Preference is given here to the applied first covering refractory coating being dried after application. Furthermore, the first covering refractory coating preferably contains mullite and/or graphite, particularly preferably from 50 to 75% by weight of mullite and/or from 1 to 5% by weight of graphite, in each case based on the total weight of the refractory coating.

In a particularly preferred embodiment of the process of the invention for producing a casting, a penetrating refractory coating is applied to at least one region of the casting mold and a first covering refractory coating which comprises no alkali metal salt or alkaline earth metal salt of carbonic acid and/or no alkali metal salt or alkaline earth metal salt of diphosphoric acid is subsequently applied to the at least one region of the casting mold and dried before coating of the at least one region of the casting mold with a refractory coating composition according to the invention (step (ii) of the process of the invention).

According to the invention, particular preference is thus given to a process for producing a casting, comprising the following steps:
- (a) providing or producing a casting mold composed of chemically bound base mold material which preferably comprises one or more binders which have been cured by means of acid and silica sand,
- (b) coating at least one region of the casting mold with a penetrating refractory coating,
- (c) coating at least part of the region of the casting mold which has been coated in step (b) with a covering refractory coating, where this first covering refractory coating comprises no alkali metal salt or alkaline earth metal salt of carbonic acid and/or no alkali metal salt or alkaline earth metal salt of diphosphoric acid, and drying the applied first covering refractory coating,
- (d) coating at least part of the region of the casting mold which has been coated in step (c) with a refractory coating composition according to the invention and drying the coated refractory coating composition,
- (e) filling the casting mold with a molten iron-carbon alloy,
- (f) allowing the iron-carbon alloy to solidify in the casting mold so as to result in a casting.

A further aspect of the present invention provides a casting mold composed of a chemically bound base mold material for producing a casting, wherein the chemically bound base mold material preferably comprises one or more binders which have been cured by means of acid and silica sand, where at least one region of the casting mold has been coated in a defined manner with a refractory coating composition according to the invention.

Preference is given according to the invention to a casting mold which has been additionally coated with a penetrating refractory coating and in which the penetrating refractory coating has penetrated underneath the refractory coating composition of the invention into the chemically bound base mold material.

According to the invention, preference is likewise given to a casting mold which additionally contains a covering refractory coating, wherein this covering refractory coating comprises no alkali metal salt or alkaline earth metal salt of carbonic acid and/or no alkali metal salt or alkaline earth metal salt of diphosphoric acid and this covering refractory coating forms a layer between the refractory coating composition of the invention and the chemically bound base mold material.

In the context of the present invention, a plurality of the aspects indicated above as being preferred are preferably realized at the same time; particular preference is given to the combinations indicated in the accompanying claims of such aspects and of the corresponding features.

The present invention will be illustrated below by means of examples and a figure.

EXAMPLES

Example 1

A mold for a casting (ANZ E 101) composed of EN-GJS 400-15 and having a casting weight of 19 200 kg and a piece weight of 15 800 kg was produced. The mold has a number of radii which are subjected to high thermal stress during casting. The iron-to-sand mass ratio was about 1:1. A mechanically regenerated furan sand having an average particle size of 0.33 mm was used as mold material for the mold. The binder SRV-1 from Hüttenes-Albertus, Düsseldorf, was used as binder and the activator 7809 from Hüttenes-Albertus, Düsseldorf, was used as activator.

A refractory coating composition according to the invention (pH 10.6) based on highly refractory magnesium silicates and oxide-ceramic components and water and containing 9% by weight of sodium carbonate was applied to a specifically characterized region (in this example, region "A") of the mold.

After casting at a casting temperature of about 1320° C., the casting was assessed. In the region "A" which had been treated with the refractory coating composition according to the invention, the casting displayed no formation of "white film". "White film" was found in the untreated region of the casting.

Example 2

Example 2 was carried out in a manner analogous to example 1, but a refractory coating composition according to the invention (pH 5.5) based on highly refractory magnesium silicates and oxide-ceramic components and water and containing 9% by weight of disodium dihydrogendiphosphate was applied.

After casting at a casting temperature of about 1320° C., the casting was assessed. In the region which had been treated with the refractory coating composition according to the invention, the casting displayed no formation of "white film". "White film" was found in the untreated region of the casting.

Example 3

Example 3 was carried out in a manner analogous to example 1, but a refractory coating composition according to the invention (pH 9.0) based on highly refractory magnesium silicates and oxide-ceramic components and water and containing 4.5% by weight of disodium dihydrogendiphosphate and 4.5% by weight of sodium carbonate was applied.

After casting at a casting temperature of about 1320° C., the casting was assessed. In the region which had been treated with the refractory coating composition according to the invention, the casting displayed no formation of "white film". "White film" was found in the untreated region of the casting.

Example 4

Example 4 was carried out in a manner analogous to example 1, but a refractory coating composition according to the invention (pH 5.5) based on highly refractory magnesium silicates and oxide-ceramic components and water and containing 9% by weight of disodium dihydrogendiphosphate was applied.

The mold was pretreated with a penetrating refractory coating Foseco PDI 1658/1 before application of the refractory coating composition according to the invention.

After casting at a casting temperature of about 1320° C., the casting was assessed. In the region which had been treated with the refractory coating composition according to the invention, the casting displayed a strong reduction in the formation of "white film". "White film" was found in the untreated region of the casting.

Example 5

Example 5 was carried out in a manner analogous to example 1, but a refractory coating composition according to the invention (pH 10.6) based on highly refractory magnesium silicates and oxide-ceramic components and water and containing 9% by weight of sodium carbonate was applied.

The mold was pretreated with a penetrating refractory coating Foseco PDI 1658/1 before application of the refractory coating composition according to the invention.

After casting at a casting temperature of about 1320° C., the casting was assessed. In the region which had been treated with the refractory coating composition according to the invention, the casting displayed a strong reduction in the formation of "white film". "White film" was found in the untreated region of the casting.

Example 6

Example 6 was carried out in a manner analogous to example 1, but a refractory coating composition according to the invention (pH 5.5) based on highly refractory magnesium silicates and oxide-ceramic components and water and containing 9% by weight of disodium dihydrogendiphosphate was applied.

The mold was pretreated with a penetrating refractory coating Foseco PDI 1658/1 and subsequently with a first covering refractory coating Foseco PDI 1514/4 and subsequently dried before application of the refractory coating composition according to the invention.

After casting at a casting temperature of about 1320° C., the casting was assessed. In the region which had been treated with the refractory coating composition according to the invention, the casting displayed a very strong reduction in the formation of "white film". "White film" was found in the untreated region of the casting.

Example 7

Example 7 was carried out in a manner analogous to example 1, but a refractory coating composition according to the invention (pH 10.6) based on highly refractory magnesium silicates and oxide-ceramic components and water and containing 9% by weight of sodium carbonate was applied.

The mold was pretreated with a penetrating refractory coating Foseco PDI 1658/1 and subsequently with a first covering refractory coating Foseco PDI 1514/4 and subsequently dried before application of the refractory coating composition according to the invention.

After casting at a casting temperature of about 1320° C., the casting was assessed. In the region which had been treated with the refractory coating composition according to the invention, the casting displayed a very strong reduction in the formation of "white film". "White film" was found in the untreated region of the casting.

Example 8

Example 8 was carried out in a manner analogous to example 1, but a refractory coating composition according to the invention (pH 9.0) based on highly refractory magnesium silicates and oxide-ceramic components and water and containing 4.5% by weight of disodium dihydrogendiphosphate and 4.5% by weight of sodium carbonate was applied.

The mold was pretreated with a penetrating refractory coating Foseco PDI 1658/1 and subsequently with a first covering refractory coating Foseco PDI 1514/4 and subsequently dried before application of the refractory coating composition according to the invention.

After casting at a casting temperature of about 1320° C., the casting was assessed. In the region which had been treated with the refractory coating composition according to the invention, the casting displayed no formation of "white film" and no sintering of the surface. The surface of the casting in the treated region was absolutely defect-free and fettling of the treated region was not necessary. "White film" was found in the untreated region of the casting.

Figure 1:
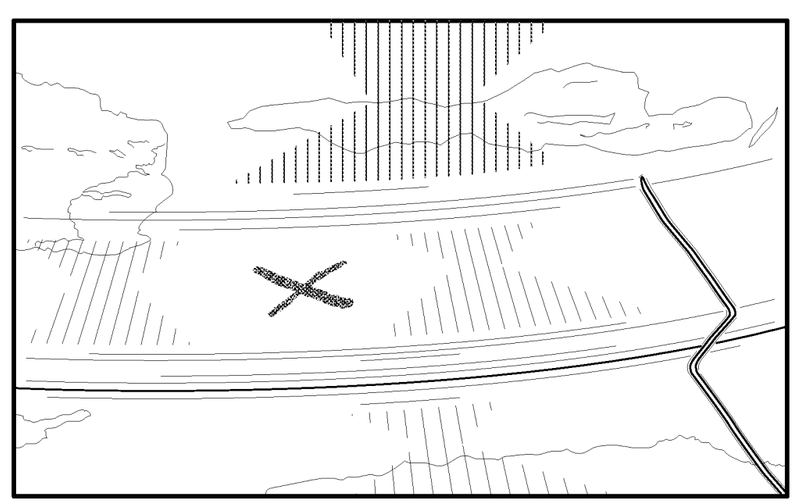
FIG. 1 is a photograph of the casting produced in example 8 with a region denoted by "X". The part of the casting denoted by "X" originates from the part of the mold which was coated with a refractory coating composition according to the invention in example 8. The surface of the casting is free of defects and displays no "white film", no sintering or pitting of the surface.

A photograph of the cast surface produced is depicted in FIG. 1 (region "X").

The invention claimed is:

1. A refractory coating composition for producing mold coatings on non-permanent molds or on cores for the casting of iron and steel, comprising
    a) 0.5 to 30% by weight of an alkali metal salt or alkaline earth metal salt of diphosphoric acid, based on the total weight of the refractory coating composition and 0.5 to 30% by weight of an alkali metal salt or alkaline earth metal salt of carbonic acid, based on the total weight of the refractory coating composition, or
    0.5 to 30% by weight of an alkali metal salt or alkaline earth metal salt of hydrogencarbonate, based on the total weight of the refractory coating composition, or
    0.5 to 30% by weight of an alkali metal salt or alkaline earth metal salt of dihydrogendiphosphate, based on the total weight of the refractory coating composition,
    b) a carrier liquid and
    c) refractory materials,
    wherein the solids content of the refractory coating composition is from 10 to 85% by weight.

2. The refractory coating composition as claimed in claim 1, comprising the alkali metal salt or alkaline earth metal salt of diphosphoric acid and the alkali metal salt or alkaline earth metal salt of carbonic acid.

3. The refractory coating composition as claimed in claim 2, wherein the refractory coating composition comprises:
    a molar ratio between the alkali metal salt or alkaline earth metal salt of carbonic acid and the alkali metal salt or alkaline earth metal salt of diphosphoric acid in the range from 1:26 to 10:2.6; and/or
    a pH of from 7 to 9.9.

4. The refractory coating composition as claimed in claim 2 wherein the alkali metal salt or alkaline earth metal salt of carbonic acid is a primary or secondary carbonate.

5. The refractory coating composition as claimed in claim 2, wherein the refractory coating composition has a molar ratio between the alkali metal salt or alkaline earth metal salt of carbonic acid and the alkali metal salt or alkaline earth metal salt of diphosphoric acid in the range from 1:13 to 5:2.6.

6. The refractory coating composition as claimed in claim 1, wherein the refractory coating composition is a covering refractory coating.

7. The refractory coating composition as claimed in claim 1, wherein
    the alkali metal salt or alkaline earth metal salt of carbonic acid is sodium hydrogencarbonate or sodium carbonate.

8. The refractory coating composition as claimed in claim 1, comprising
    (a) from 3 to 50% by weight of the alkali metal salt or alkaline earth metal salt of carbonic acid, based on the total weight of the refractory coating composition, and/or
    (b) from 3 to 50% by weight of the alkali metal salt or alkaline earth metal salt of diphosphoric acid, based on the total weight of the refractory coating composition.

9. The refractory coating composition as claimed in claim 1, wherein the carrier liquid
    a) is water or contains water and/or
    b) is one or more organic solvents or contains these, where one or all at least one of the organic solvents is/are alcohol or alcohols.

10. The refractory coating composition as claimed in claim 1, wherein the carrier liquid is an alcohol or contains alcohol.

11. The refractory coating composition as claimed in claim 1, comprising
    a) from 3 to 15% by weight of sodium hydrogencarbonate and/or sodium carbonate and from 3 to 15% by weight of disodium dihydrogendiphosphate, in each case based on the total weight of the refractory coating composition,
    b) a carrier liquid selected from the group consisting of water, ethanol, 1-propanol, 2-propanol and mixtures thereof,
    c) refractory materials selected from the group consisting of silica, aluminum oxide, zirconium dioxide, aluminum silicates, mullite, zircon sands, zirconium silicates, olivine, talc, mica, coke, feldspar, diatomite, calcined kaolins, kaolinite, metakaolinite, magnesium silicates, iron oxide, bauxite, graphite and mixtures thereof,
    where the refractory coating composition has a pH of from 7 to 9.9, and
    the weight ratio between a) sodium hydrogencarbonate or sodium carbonate and b) disodium dihydrogendiphosphate is in the range from 1:10 to 10:1.

12. The refractory coating composition as claimed in claim 1, wherein the refractory coating composition has a pH of from 7.5 to 9.5.

13. The refractory coating composition as claimed in claim 1, wherein the carrier liquid is an alcohol selected from the group consisting of methanol, ethanol, 1-propanol, 2-propanol, n-butanol, isobutanol, sec-butanol, tert-butanol, pentan-1-ol, pentan-2-ol, pentan-3-ol, 2-methylbutan-1-ol, 2-methylbutan-2-ol, 3-methylbutan-1-ol, 3-methylbutan-2-ol, 2,2-dimethylpropan-1-ol, hexan-1-ol, hexan-2-ol, hexan-3-ol, 2-methylpentan-l-ol, 3-methylpentan-l-ol, 4-methylpentan-1-ol, 2-methylpentan-2-ol, 3-methylpentan-2-ol, 4-methylpentan-2-ol, 2-methylpentan-3-ol, 3-methylpentan-3-ol, 2,2-dimethylbutan-1-ol, 2,3-dimethylbutan-1-ol, 3,3-dimethylbutan-1-ol, 2,3-dimethylbutan-2-ol, 3,3-dimethylbutan-2-ol, 2-ethylbutan-1-ol, and mixtures thereof.

14. The refractory coating composition as claimed in claim 1, wherein the alkali metal salt or alkaline earth metal salt of carbonic acid is a primary or secondary carbonate.

15. The refractory coating composition as claimed in claim 1,
    wherein the refractory coating composition comprises:
    a molar ratio between the alkali metal salt or alkaline earth metal salt of carbonic acid and the alkali metal salt or alkaline earth metal salt of diphosphoric acid in the range from 1:26 to 10:2.6; and/or
    a pH of from 7 to 9.9.

16. The refractory coating composition as claimed in claim 1, comprising
   0.5 to 30% by weight of disodium dihydrogendiphosphate, based on the total weight of the refractory composition and 0.5 to 30% by weight of an alkali metal salt or alkaline earth metal salt of carbonic acid, based on the total weight of the refractory composition,
   or
   0.5 to 30% by weight of disodium dihydrogendiphosphate, based on the total weight of the refractory composition.

17. A method of coating non-permanent molds or cores for the casting of iron and steel, comprising:
   providing or producing a refractory coating composition as claimed in claim 1.

18. A process for producing a casting, comprising the following steps:
   (i) providing or producing a casting mold composed of chemically bound base mold material,
   (ii) coating at least one region of the casting mold with a refractory coating composition as defined in claim 1 and drying of the coated refractory coating composition,
   (iii) filling the casting mold with a molten iron-carbon alloy,
   (iv) allowing the iron-carbon alloy to solidify in the casting mold so as to result in a casting.

* * * * *